(12) United States Patent
Kanevsky et al.

(10) Patent No.: US 6,665,644 B1
(45) Date of Patent: Dec. 16, 2003

(54) CONVERSATIONAL DATA MINING

(75) Inventors: Dimitri Kanevsky, Ossining, NY (US); Stephane Herman Maes, Danbury, CT (US); Jeffrey Scott Sorensen, Seymour, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/371,400

(22) Filed: Aug. 10, 1999

(51) Int. Cl.$^7$ .............................................. G10L 15/00
(52) U.S. Cl. ...................... 704/275; 704/246; 704/270
(58) Field of Search .............................. 704/275, 246, 704/207, 251, 270, 271, 273; 379/88.01, 88.16

(56) References Cited

U.S. PATENT DOCUMENTS

| | | | | |
|---|---|---|---|---|
| 4,142,067 A | * | 2/1979 | Williamson | 704/258 |
| 5,751,904 A | * | 5/1998 | Inazumi | 704/232 |
| 5,870,709 A | * | 2/1999 | Bernstein | 704/275 |
| 5,895,447 A | | 4/1999 | Ittycheriah et al. | 7004/231 |
| 5,915,001 A | * | 6/1999 | Uppaluru | 379/88.22 |
| 5,918,222 A | * | 6/1999 | Fukui et al. | 704/275 |
| 5,949,854 A | * | 9/1999 | Sato | 379/88.16 |
| 6,014,647 A | * | 1/2000 | Nizzari et al. | 705/39 |
| 6,026,397 A | * | 2/2000 | Sheppard | 707/5 |
| 6,052,441 A | * | 4/2000 | Sato | 379/88.16 |
| 6,122,615 A | * | 9/2000 | Yamamoto | 704/252 |
| 6,151,601 A | * | 11/2000 | Papierniak et al. | 707/10 |
| 6,161,090 A | * | 12/2000 | Kanevsky et al. | |

OTHER PUBLICATIONS

Lincoln et al., "A Comparison of Two Unsupervised Approaches to Accent Indentification," paper presented at International Confernce on Spoken Language Processing, Sydney, Australia, Nov. 30–Dec. 4, 1998.

Matrouf et al., "Language Indentification Incorporation Lexical Information", paper presented at international Conference on Spoken Language Processing, Sydney, Australia, Nov. 30–Dec. 4, 1998.

Pereira & Watson, "Some Acoustic Characteristics of Emotion," paper presented at International Conference on Spoken Language Processing, Sydney, Australia, Nov. 30–Dec. 4, 1998.

(List continued on next page.)

*Primary Examiner*—Daniel Abebe
(74) *Attorney, Agent, or Firm*—Thu Ann Dang

(57) ABSTRACT

A method for collecting data associated with the voice of a voice system user includes conducting a plurality of conversations with a plurality of voice system users. For each conversation, a speech waveform is captured and digitized, and at least one acoustic feature is extracted. The features are correlated with at least one attribute such as gender, age, accent, native language, dialect, socioeconomic classification, educational level and emotional state. Attribute data and at least one identifying indicia are stored for each user in a data warehouse, in a form to facilitate subsequent data mining thereon. The resulting collection of stored data is then mined to provide information for modifying underlying business logic of the voice system. An apparatus suitable for carrying out the method includes a dialog management unit, an audio capture module, an acoustic from end, a processing module and a data warehouse. Appropriate method steps can be implemented by a digital computer running a suitable program stored on a program storage device.

31 Claims, 6 Drawing Sheets

OTHER PUBLICATIONS

Amir & Ron, "Towards an Automatic Classification of Emotions in Speech," paper presented at International Conference on Spoken Language Processing, Sydney, Australia, Nov. 30–Dec. 4, 1998.

Whiteside, "Simulated Emotions: An Acoustic Study of Voice and Perturbation Measures," paper presented at International Confernce on Spoken Language Processing, Sydney, Australia, Nov. 30–Dec. 4, 1998.

University of Rochester Trains Home Page. http://www.cs.rochester.edu/research/trains/home.htm, May 1, 1998.

Allen & Ferguson, "A Dialog–Based Approach to Mixed–Initiative Plan Management," http://www.cs.rochester.edu/research/trains/arp. Sep. 6, 1995.

Allen, "Parsing Spontaneous Dialogue," http://www.cs.rochester.edu/research/trains/nsf–dialog, circa 1997.

Anonymous, "A Mind Reader? This Computer Understands What You Really Want," http://www.cs.rochester.edu/pr/releases/cs/allen.htm, Jun. 21, 1996.

Lehnert et al., "BORIS—An Experiment in In–Depth Understanding of Narratives," *Artificial Intellegence* 20 pp. 15–62 (1983).

* cited by examiner

CONVERSATIONAL DATA MINING

BACKGROUND OF THE INVENTION

1. Field of the Invention

The present invention relates to voice-oriented systems, and more particularly relates to an acoustically oriented method and apparatus to facilitate data mining and an acoustically oriented method and apparatus to tailor response of a voice system to an acoustically determined state of a voice system user.

2. Brief Description of the Prior Art

Data mining is an interdisciplinary field which has recently increased in popularity. It refers to the use of methods which extract information from data in an unsupervised manner, or with very little supervision. "Unsupervised" refers to techniques wherein there is no advance labeling; classes are allowed to develop on their own. Sounds are clustered and one sees which classes develop. Data mining is used in market, risk and fraud management.

In the data mining field, it is generally agreed that more data is better. Accordingly, companies engaged in data mining frequently compile or acquire customer data bases. These data bases may be based on mail-order history, past customer history, credit history and the like. It is anticipated that the customer's electronic business and internet behavior will soon also provide a basis for customer data bases. The nature of the stored information may result from the manual or automatic encoding of either a transaction or an event. An example of a transaction might be that a given person bought a given product at a given price under certain conditions, or that a given person responded to a certain mailing. An example of an event could include a person having a car accident on a certain date, or a given family moving in the last month.

The data on which data mining is performed is traditionally stored in a data warehouse. Once business objectives have been determined, the data warehouse is examined to select relevant features, evaluate the quality of the data, and transform it into analytical models suited for the intended analysis. Techniques such as predictive modeling, data base segmentation, link analysis and deviation detection can then be applied so as to output targets, forecasts or detections. Following validation, the resulting models can be deployed.

Today, it is common for a variety of transactions to be performed over the telephone via a human operator or an interactive voice response (IVR) system. It is known that voice, which is the mode of communication in such transactions, carries information about a variety of user attributes, such as gender, age, native language, accent, dialect, socioeconomic condition, level of education and emotional state. One or more of these parameters may be valuable to individuals engaged in data mining. At present, the treasure trove of data contained in these transactions is either completely lost to data miners, or else would have to be manually indexed in order to be effectively employed.

There is, therefore, a need in the prior art for a method for collecting, in a data warehouse, data associated with the voice of a voice system user which can efficiently and automatically make use of the data available in transactions using voice systems, such as telephones, kiosks, and the like. It would be desirable for the method to also be implemented in real-time, with or without data warehouse storage, to permit "on the fly" modification of voice systems, such as interactive voice response systems, and the like.

SUMMARY OF THE INVENTION

The present invention, which addresses the needs identified in the prior art, provides a method for collecting, in a data warehouse, data associated with the voice of a voice system user. The method comprises the steps of conducting a conversation with the voice system user, capturing a speech waveform, digitizing the speech waveform, extracting at least one acoustic feature from the digitized speech waveform, and then storing attribute data corresponding to the acoustic feature in the data warehouse. The conversation can be conducted with the voice system user via at least one of a human operator and a voice-enabled machine system. The speech waveform to be captured is that associated with utterances spoken by the voice system user during the conversation. The digitizing of the speech waveform provides a digitized speech waveform. The at least one acoustic feature is extracted from the digitized waveform and correlates with at least one user attribute, such as gender, age, accent, native language, dialect, socioeconomic classification, educational level and emotional state of the user. The attribute data which is stored in the data warehouse corresponds to the acoustic feature which correlates with the at least one user attribute, and is stored together with at least one identifying indicia. The data is stored in the data warehouse in a form to facilitate subsequent data mining thereon.

The present invention also provides a method of tailoring a voice system response to an acoustically-determined state of a voice system user. The method includes the step of conducting a conversation with the voice system user via the voice system. The method further includes the steps of capturing a speech waveform and digitizing the speech waveform, as discussed previously. Yet further, the method includes the step of extracting an acoustic feature from the digitized speech waveform, also as set forth above. Finally, the method includes the step of modifying behavior of the voice system based on the at least one user attribute with which the at least one acoustic feature is correlated.

The present invention further includes a program storage device readable by machine, tangibly embodying a program of instructions executable by the machine to perform either of the methods just discussed.

The present invention further provides an apparatus for collecting data associated with the voice of a user. The apparatus comprises a dialog management unit, an audio capture module, an acoustic front end, a processing module, and a data warehouse. The dialog management unit conducts a conversation with the user. The audio capture module is coupled to the dialog management unit and captures a speech waveform associated with utterances spoken by the user during the conversation.

The acoustic front end is coupled to the audio capture module and is configured to receive and digitize the speech waveform so as to provide a digitized speech waveform, and to extract, from the digitized speech waveform, at least one acoustic feature which is correlated with at least one user attribute. The at least one user attribute can include at least one of the user attributes discussed above with respect to the methods.

The processing module is coupled to the acoustic front end and analyzes the at least one acoustic feature to determine the at least one user attribute. The data warehouse is coupled to the processing module and stores the at least one user attribute in a form for subsequent data mining thereon.

The present invention still further provides a real-time-modifiable voice system for interaction with a user. The system includes a dialog management unit of the type discussed above, an audio capture module of the type discussed above, and an acoustic front end of the type discussed above. Further, the voice system includes a processing module of the type discussed above. The processing module is configured so as to modify behavior of the voice system based on the at least one user attribute.

For a better understanding of the present invention, together with other and further advantages thereof, reference is made to the following description, taken in conjunction with the accompanying drawings, and the scope of the invention will be pointed out in the appended claims.

DETAILED DESCRIPTION OF THE INVENTION

Figure 1:
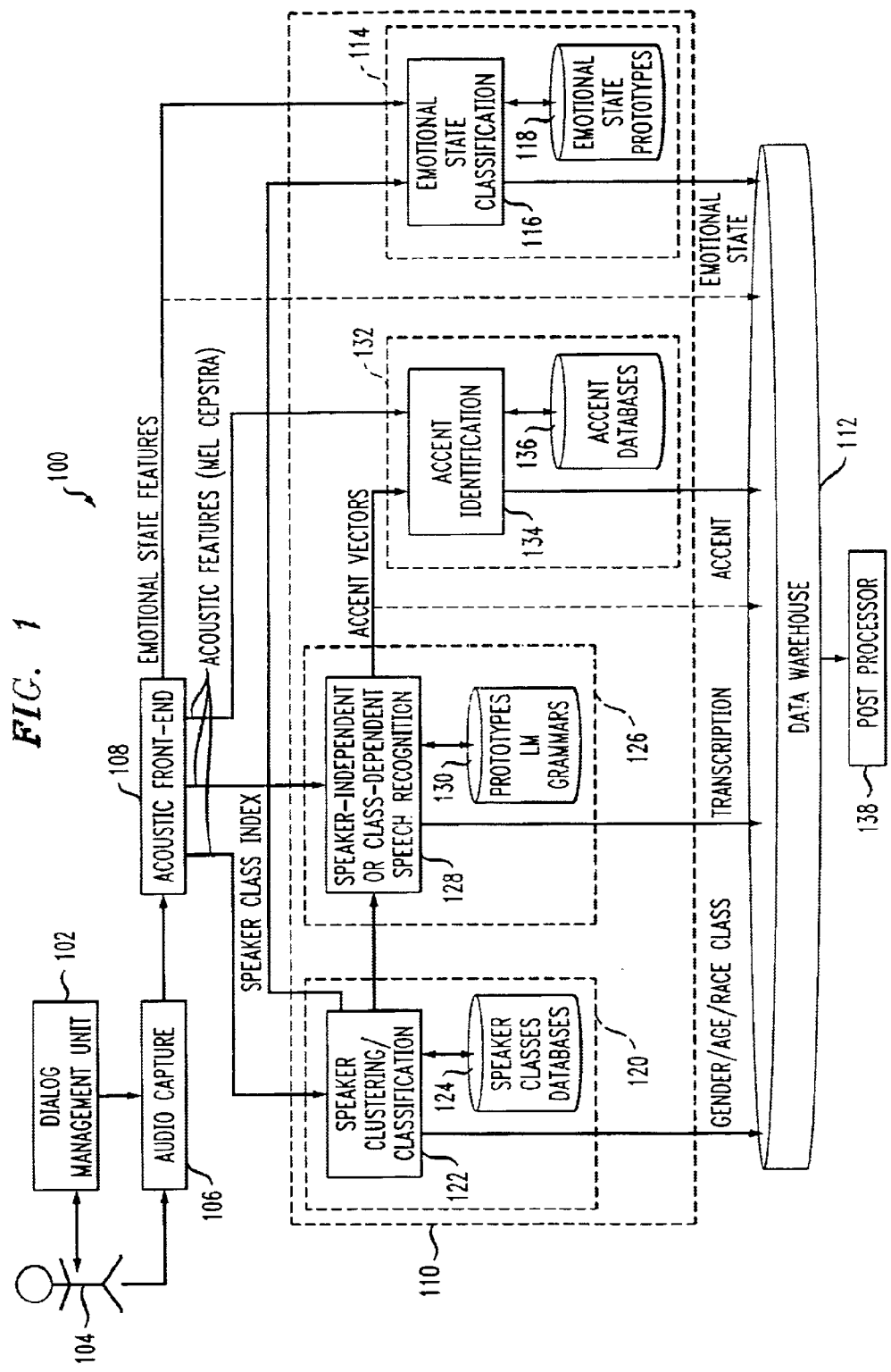
FIG. 1 is a diagram of an apparatus for collecting data associated with a voice of a user, in accordance with the present invention.

Reference should now had to FIG. 1 which depicts an apparatus for collecting data associated with a voice of a user, in accordance with the present invention. The apparatus is designated generally as 100. The apparatus includes a dialog management unit 102 which conducts a conversation with the user 104. Apparatus 100 further includes an audio capture module 106 which is coupled to the dialog management unit 102 and which captures a speech waveform associated with utterances spoken by the user 104 during the conversation. As used herein, a conversation should be broadly understood to include any interaction, between a first human and either a second human, a machine, or a combination thereof, which includes at least some speech.

Apparatus 100 further includes an acoustic front end 108 which is coupled to the audio capture module 106 and which is configured to receive and digitize the speech waveform so as to provide a digitized speech waveform. Further, acoustic front end 108 is also configured to extract, from the digitized speech waveform, at least one acoustic feature which is correlated with at least one user attribute, i.e., of the user 104. The at least one user attribute can include at least one of the following gender of the user, age of the user, accent of the user, native language of the user, dialect of the user, socioeconomic classification of the user, educational level of the user, and emotional state of the user. The dialog management unit 102 may employ acoustic features, such as MEL cepstra, obtained from acoustic front end 108 and may therefore, if desired, have a direct coupling thereto.

Apparatus 100 further includes a processing module 110 which is coupled to the acoustic front end 108 and which analyzes the at least one acoustic feature to determine the at least one user attribute. Yet further, apparatus 100 includes a data warehouse 112 which is coupled to the processing module 110 and which stores the at least one user attribute, together with at least one identifying indicia, in a form for subsequent data mining thereon. Identifying indicia will be discussed elsewhere herein.

The gender of the user can be determined by classifying the pitch of the user's voice, or by simply clustering the features. In the latter method, voice prints associated with a large set of speakers of a given gender are built and a speaker classification is then performed with the two sets of models. Age of the user can also be determined via classification of age groups, in a manner similar to gender. Although having limited reliability, broad classes of ages, such as children, teenagers, adults and senior citizens can be separated in this fashion.

Determination of accent from acoustic features is known in the art. For example, the paper "A Comparison of Two Unsupervised Approaches to Accent Identification" by Lincoln et al., presented at the 1998 International Conference on Spoken Language Processing, Sidney, Australia [hereinafter ICSLP'98], sets forth useful techniques. Native language of the user can be determined in a manner essentially equivalent to accent classification. Meta information about the native language of the speaker can be added to define each accent/native language model.

That is, at the creation of the models for each native language, one employs a speaker or speakers who are tagged with that language as their native language. The paper "Language Identification Incorporating Lexical Information" by Matrouf et al., also presented at ICSLP'98, discusses various techniques for language identification.

The user's dialect can be determined from the accent and the usage of keywords or idioms which are specific to a given dialect. For example, in the French language, the choice of "nonante" for the numeral 90 instead of "Quatre Vingt Dix" would identify the speaker as being of Belgian or Swiss extraction, and not French or Canadian. Further, the consequent choice of "quatre-vingt" instead of "octante" or "Huitante" for the numeral 80 would identify the individual as Belgian and not Swiss. In American English, the choice of "grocery sack" rather than "grocery bag" might identify a person as being of Midwestern origin rather than Midatlantic origin. Another example of Midwestern versus Midatlantic American English would be the choice of "pop" for a soft drink in the Midwest and the choice of "soda" for the corresponding soft drink in the middle Atlantic region. In an international context, the use of "holiday" rather than "vacation" might identify someone as being of British rather than United States origin. The operations described in this paragraph can be carried out using a speech recognizer 126 which will be discussed below.

The socioeconomic classification of the user can include such factors as the racial background of the user, ethnic background of the user, and economic class of the user, for example, blue collar, white collar-middle class, or wealthy. Such determinations can be made via annotated accents and dialects at the moment of training, as well as by examining the choice of words of the user. While only moderately reliable, it is believed that these techniques will give sufficient insight into the background of the user so as to be useful for data mining.

The educational level of the user can be determined by the word choice and accent, in a manner similar to the socioeconomic classification; again, only partial reliability is expected, but sufficient for data mining purposes.

Determination of the emotional state of the user from acoustic features is well known in the art. Emotional categories which can be recognized include hot anger, cold anger, panic, fear, anxiety, sadness, elation, despair, happiness, interest, boredom, shame, contempt, confusion, disgust and pride. Exemplary methods of determining emotional state from relevant acoustic features are set forth in the following papers: "Some Acoustic Characteristics of Emotion" by Pereira and Watson, "Towards an Automatic Classification of Emotions in Speech" by Amir and Ron, and "Simulated Emotions: An Acoustic Study of Voice and Perturbation Measures" by Whiteside, all of which were presented at ICSLP'98.

The audio capture module 106 can include, for example, at least one of an analog-to-digital converter board, an interactive voice response system, and a microphone. The dialog management unit 102 can include a telephone interactive voice response system, for example, the same one used to implement the audio capturing. Alternatively, the dialog management unit may simply be an acoustic interface to a human operator. Dialog management unit 102 can include natural language understanding (NLU), natural language generation (NLG), finite state grammar (FSG), and/or text-to-speech syntheses (TTS) for machine-prompting the user in lieu of, or in addition to, the human operator. The processing module 110 can be implemented in the processor portion of the IVR, or can be implemented in a separate general purpose computer with appropriate software. Still further, the processing module can be implemented using an application specific circuit such as an application specific integrated circuit (ASIC) or can be implemented in an application specific circuit employing discrete components, or a combination of discrete and integrated components.

Processing module 110 can include an emotional state classifier 114. Classifier 114 can in turn include an emotional state classification module 116 and an emotional state prototype data base 118.

Processing module 110 can further include a speaker clusterer and classifier 120. Element 120 can further include a speaker clustering and classification module 122 and a speaker class data base 124.

Processing module 110 can further include a speech recognizer 126 which can, in turn, itself include a speech recognition module 128 and a speech prototype, language model and grammar database 130. Speech recognizer 126 can be part of the dialog management unit 102 or, for example, a separate element within the implementation of processing module 110. Yet further, processing module 110 can include an accent identifier 132, which in turn includes an accent identification module 134 and an accent data base 136.

Processing module 110 can include any one of elements 114, 120, 126 and 132; all of those elements together; or any combination thereof.

Apparatus 100 can further include a post processor 138 which is coupled to the data warehouse 112 and which is configured to transcribe user utterances and to perform keyword spotting thereon. Although shown as a separate item in FIG. 1, the post processor can be a part of the processing module 110 or of any of the sub-components thereof. For example, it can be implemented as part of the speech recognizer 126. Post processor 138 can be implemented as part of the processor of an IVR, as an application specific circuit, or on a general purpose computer with suitable software modules. Post processor 138 can employ speech recognizer 126. Post processor 138 can also include a semantic module (not shown) to interpret meaning of phrases. The semantic module could be used by speech recognizer 126 to indicate that some decoding candidates in a list are meaningless and should be discarded/replaced with meaningful candidates.

The acoustic front end 108 can typically be an eight dimensions plus energy front end as known in the art. However, it should be understood that 13, 24, or any other number of dimensions could be used. MEL cepstra can be computed, for example, over 25 ms frames with a 10 ms overlap, along with the delta and delta delta parameters, that is, the first and second finite derivatives. Such acoustic features can be supplied to the speaker clusterer and classifier 120, speech recognizer 126 and accent identifier 132, as shown in FIG. 1.

Other types of acoustic features can be extracted by the acoustic front end 108. These can be designated as emotional state features, such as running average pitch, running pitch variance, pitch jitter, running energy variance, speech rate, shimmer, fundamental frequency, and variation in fundamental frequency. Pitch jitter refers to the number of sign changes of the first derivative of pitch. Shimmer is energy jitter. These features can be supplied from the acoustic front end 108 to the emotional state classifier 114. The aforementioned acoustic features, including the MEL cepstra and the emotional state features, can be thought of as the raw, that is, unprocessed features.

User queries can be transcribed by an IVR or otherwise. Speech features can first be processed by a text-independent speaker classification system, for example, in speaker clusterer and classifier 120. This permits classification of the speakers based on acoustic similarities of their voices. Implementation and use of such a system is disclosed in U.S. patent application Ser. No. 60/011,058, filed Feb. 2, 1996; U.S. patent application Ser. No. 08/787,031, filed Jan. 28, 1997 (now U.S. Pat. No. 5,895,447 issued Apr. 20, 1999); U.S. patent application Ser. No. 08/788,471, filed Jan. 28, 1997; and U.S. patent application Ser. No. 08/787,029, filed Jan. 28, 1997, all of which are co-assigned to International Business Machines Corporation, and the disclosure of all of which is expressly incorporated herein by reference for all purposes. The classification of the speakers can be supervised or unsupervised. In the supervised case, the classes have been decided beforehand based on external information. Typically, such classification can separate between male and female, adult versus child, native speakers versus different classes of non-native speakers, and the like. The indices of this classification process constitute processed features. The results of this process can be supplied to the emotional state classifier 114 and can be used to normalize the emotional state features with respect to the average (mean) observed for a given class, during training, for a neutral emotional state. The normalized emotional state features are used by the emotional state classifier 114 which then outputs an estimate of the emotional state. This output is also considered to be part of the processed features. To summarize, the emotional state features can be normalized by the emotional state classifier 114 with respect to each class produced by the speech clusterer and classifier 120. A feature can be normalized as follows. Let $X_0$ be the normal frequency. Let $X_i$ be the measured frequency. Then, the normalized feature will be given by $X_i$ minus $X_0$. This quantity can be positive or negative, and is not, in general, dimensionless.

The speech recognizer 126 can transcribe the queries from the user. It can be a speaker-independent or class-dependent large vocabulary continuous speech recognition, or system could be something as simple as a keyword spotter to detect insults (for example) and the like. Such systems are well known in the art. The output can be full sentences, but finer granularity can also be attained; for example, time alignment of the recognized words. The time stamped transcriptions can also be considered as part of the processed features, and will be discussed further below with respect to methods in accordance with the present invention. Thus, conversation from every stage of a transaction can be transcribed and stored. As shown in FIG. 1, appropriate data is transferred from the speaker clusterer and classifier 120 to the emotional state classifier 114 and the speech recognizer 126. As noted, it is possible to perform accent, dialect and language recognition with the input speech from user 104. A continuous speech recognizer can be trained on speech with several speakers having the different accents which are to be recognized. Each of the training speakers is also associated with an accent vector, with each dimension representing the most likely mixture component associated with each state of each lefeme. The speakers can be clustered based on the distance between these accent vectors, and the clusters can be identified by, for example, the accent of the member speakers. The accent identification can be performed by extracting an accent vector from the user's speech and classifying it. As noted, dialect, socioeconomic classification, and the like can be estimated based on vocabulary and word series used by the user 104. Appropriate key words, sentences, or grammatical mistakes to detect can be compiled via expert linguistic knowledge. The accent, socioeconomic background, gender, age and the like are part of the processed features. As shown in FIG. 1, any of the processed features, indicated by the solid arrows, can be stored in the data warehouse 112. Further, raw features, indicated by the dotted lines can also be stored in the data warehouse 112.

Any of the processed or raw features can be stored in the data warehouse 112 and then associated with the other data which has been collected, upon completion of the transaction. Classical data mining techniques can then be applied. Such techniques are known, for example, as set forth in the book *Data Warehousing Data Mining and OAAP* by Alex Berson and Stephen J. Smith, published by McGraw Hill in 1997, and in *Discovering Data Mining*, by Cabena et al., published by Prentice Hall in 1998. For a given business objective, for example, target marketing, predictive models or classifiers are automatically obtained by applying appropriate mining recipes. All data stored in the data warehouse 112 can be stored in a format to facilitate subsequent data mining thereon. Those of skill in the art are aware of appropriate formats for data which is to be mined, as set forth in the two cited reference books. Business objectives can include, for example, detection of users who are vulnerable to a proposal to buy a given product or service, detection of users who have problems with the automated system and should be transferred to an operator and detection of users who are angry at the service and should be transferred to a supervisory person. The user 104 can be a customer of a business which employs the apparatus 100, or can be a client of some other type of institution, such as a nonprofit institution, a government agency or the like.

Features can be extracted and decisions dynamically returned by the models. This will be discussed further below.

Figure 2:
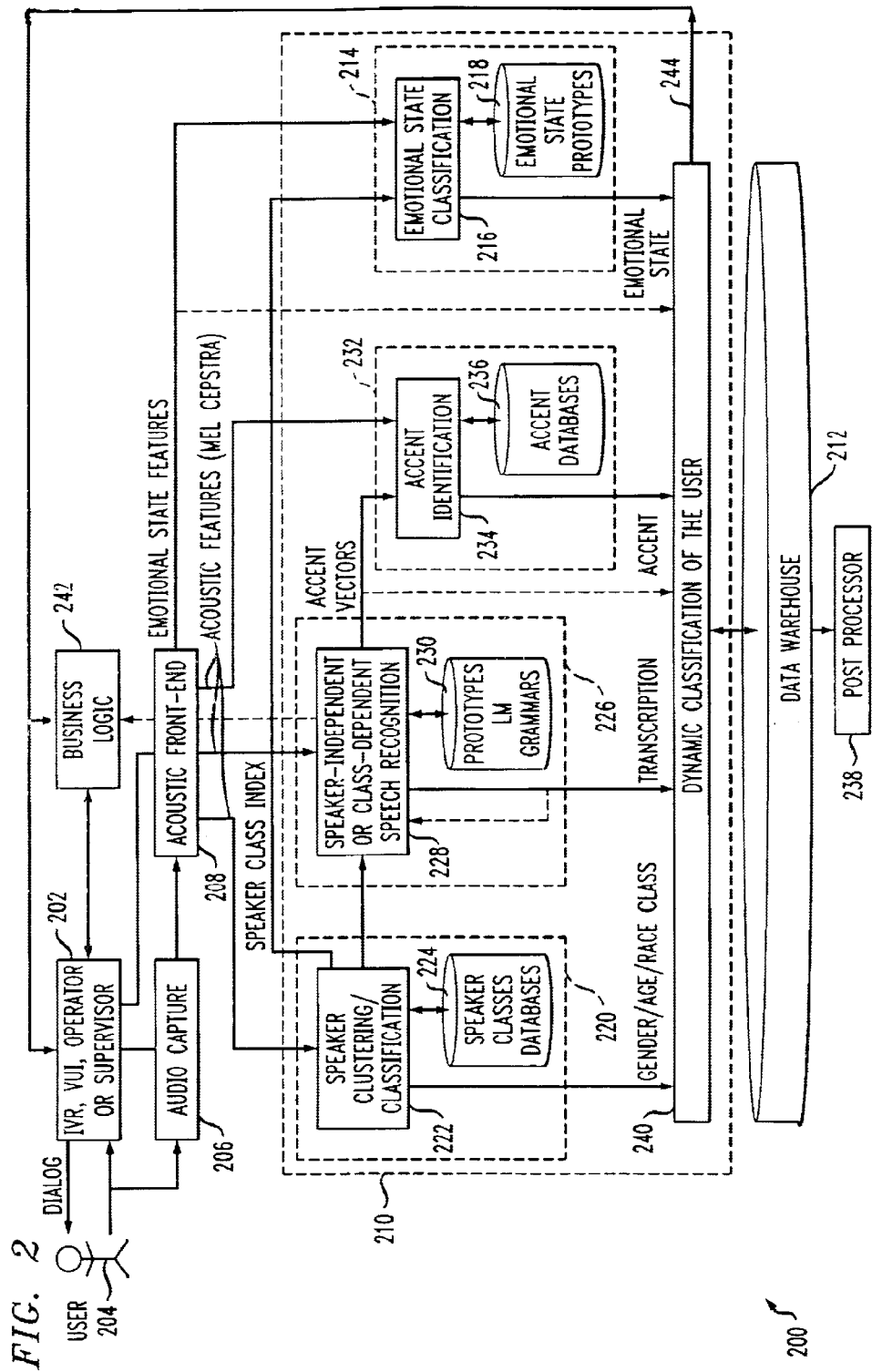
FIG. 2 is a diagram of a real-time-modifiable voice system for interaction with a user, in accordance with the present invention.

Reference should now be had to FIG. 2 which depicts a real-time-modifiable voice system for interaction with a user, in accordance with the present invention, which is designated generally as 200. Elements in FIG. 2 which are similar to those in FIG. 1 have received the same reference numerals incremented by 100. System 200 can include a dialog management unit 202 similar to that discussed above. In particular, as suggested in FIG. 2, unit 202 can be a human operator or supervisor, an IVR, or a Voice User Interface (VUI). System 200 can also include an audio capture module 206 similar to that described above, and an acoustic front end 208, also similar to that described above. Just as with apparatus 100, unit 202 can be directly coupled to acoustic front end 208, if desired, to permit use of MEL cepstra or other acoustic features determined by front end 208. Further, system 200 includes a processing module 210 similar to that described above, but having certain additional features which will now be discussed. Processing module 210 can include a dynamic classification module 240 which performs dynamic classification of the user 204. Accordingly, processing module 210 is configured to modify behavior of the voice system 200 based on at least one user attribute which has been determined based on at least one acoustic feature extracted from the user's speech. System 200 can further include a business logic unit 242 which is coupled to the dialog management unit 202, the dynamic classification module 240, and optionally to the acoustic front end 208. The business logic unit can be implemented as a processing portion of the IVR or VUI, can be part of an appropriately programmed general purpose computer, or can be an application specific circuit. At present, it is believed preferable that the processing module 110, 210 (including module 240) be implemented as a general purpose computer and that the business logic 242 be implemented in a processor portion of an interactive voice response system. Dynamic classification module 240 can be configured to provide feedback, which can be real-time feedback, to the business logic unit 242 and the dialog management unit 202, as suggested by the heavy line 244.

A data warehouse 212 and post processor 238 can be optionally provided as shown and can operate as discussed above with respect to the data collecting apparatus 100. It should be emphasized, however, that in the real-time-modifiable voice system 200 of the present invention, as data warehousing is optional and if desired, the system can be limited to the real time feedback discussed with respect to elements 240, 242 and 202, and suggested by line 244.

Processing module 210 can modify behavior of the system 200, at least in part, by prompting a human operator thereof, as suggested by feedback line 244 connected with dialog management unit 202. For example, a human operator could be alerted when an angry emotional state of the user 204 is detected and could be prompted to utter soothing words to the user 204, or transfer the user to a higher level human supervisor. Further, the processing module 210 could modify business logic 242 of the system 200. This could be done, for example, when both the processing module 210 and business logic unit 242 were part of an IVR system. Examples of modification of business logic will be discussed further below, but could include tailoring a marketing offer to the user 204 based on attributes of the user detected by the system 200.

As noted- processing module 210, and the sub-elements thereof, perform in essentially the same fashion as processing module 110 in FIG. 1. Note, however, the option for feedback of the output of speech recognition module 228, to business logic 242, as suggested by the dotted lines and arrows in FIG. 2.

It should be noted that throughout this application, including the specification and drawings thereof, the term "mood" is considered to be an equivalent of the term "emotional state."

Figure 3:
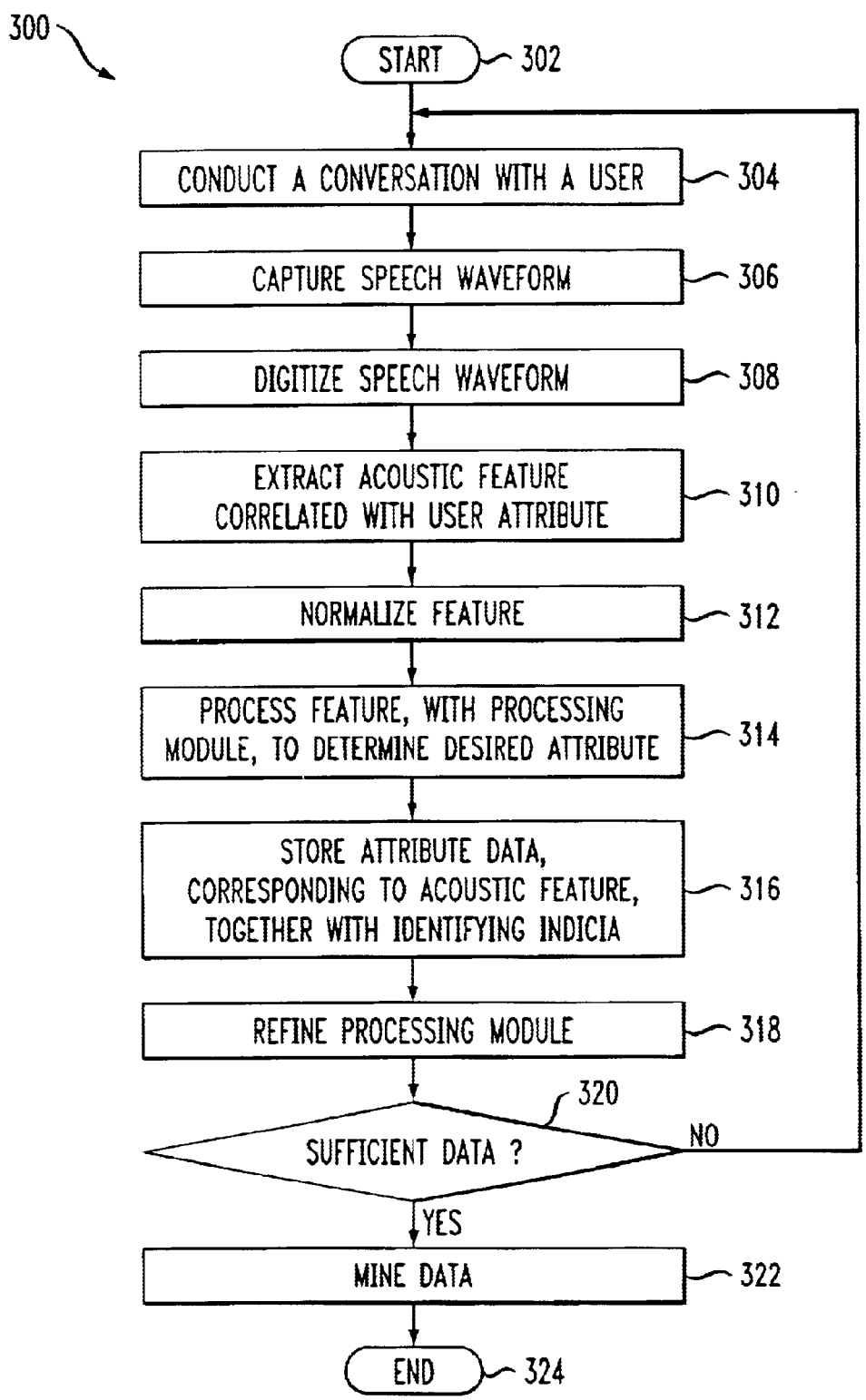
FIG. 3 is a flowchart of a method for collecting, in a data warehouse, data associated with a voice of a voice system user, in accordance with the present invention.

Attention should now be given to FIG. 3 which depicts a flowchart, 300, of a method for collecting, in a data warehouse, data associated with the voice of a voice system user. After starting, at block 302, the method includes the steps of conducting a conversation with a user of the voice system, per block 304, via at least one of a human operator and a voice-enabled machine system. The method further includes capturing a speech waveform, per block 306, which is associated with utterances spoken by the voice system user during the conversation. Yet further, the method includes the step of digitizing the speech waveform, per block 308, so as to provide a digitized speech waveform. Still further, per block 310, the method includes the step of extracting, from the digitized speech waveform, at least one acoustic feature which is correlated with at least one user attribute. The at least one acoustic feature can be any of the features discussed above, for example, MEL cepstra or any one of the emotional state features, for example. The user attributes can include any of the user attributes discussed above, that is, gender, age, accent and the remainder of the aforementioned attributes. Finally, the method can include the step, per block 316, of storing attribute data corresponding to the acoustic feature which is correlated with the at least one user attribute, together with at least one identifying indicia, in the data warehouse in a form to facilitate subsequent data mining thereon. Any type of identifying indicia which is desired can be used; this term is to be understood broadly. For example, the identifying indicia can be a time stamp which correlates the various features to a conversation conducted at a given time, thereby identifying the given transaction; can be an identification number or name, or the like, which identifies the user; or can be any other item of information associated with the attribute data which is useful in the data mining process.

As indicated at the decision block 320, the aforementioned steps in blocks 304, 306, 308, 310, and 316 can be repeated for a plurality of additional conversations to provide a collection of stored data including the attribute data and identifying indicia. This can be repeated until there is sufficient data for data mining. Then, as indicated at block 322, the collection of stored data can be mined to provide information which may be desired, for example, information to be used in modifying the underlying business logic of the voice system.

As noted, the storing step, per block 316, can comprise storing wherein the at least one identifying indicia is a time stamp. The more data which is collected, the better models which can be built. Data collection can be annotated, possibly by using an existing set of classifiers already trained to identify each item, or purely via annotations from transcribers who estimate the desired items. A combination of these two techniques can also be employed. It is preferred that the plurality of additional conversations discussed above be conducted with a plurality of different users, such that there will be data from a large set of speakers.

The extracting step, per block 310, can include extracting at least one of fundamental frequency, variation in fundamental frequency, running average pitch, running pitch variance, pitch jitter, running energy variance, speech rate and shimmer as at least one emotional state feature which is correlated with the emotional state of the user.

Per block 312, the extracted features can be normalized; this is believed to be particularly valuable when the features are those indicative of emotional state. This has been discussed previously with respect to the apparatus of the present invention.

The method 300 can further include the additional step, per block 314, of processing the at least one acoustic feature to determine the at least one user attribute. In this case, processed features are obtained, and the attribute data can be a value of the attribute itself, for example, a value of the emotional state. This can be distinguished from the method when only raw data is stored, in which case the attribute data can simply be the raw features, i.e., MEL cepstra or emotional state features discussed above. Thus, to summarize, either raw acoustic features (e.g., waveform, MEL cepstra, emotional state features), processed acoustic features (e.g., value of emotional state (happy, sad, confused), transcription of conversation) or both raw and processed acoustic features may be stored in block 316.

Referring to block 318, the processing module, used in performing the processing step per block 314, can be automatically refined each time an additional attribute is stored in the data warehouse. That is, the clustering, classification, and recognition functions discussed above with respect to the apparatus can be improved with each new piece of data.

Figure 4:
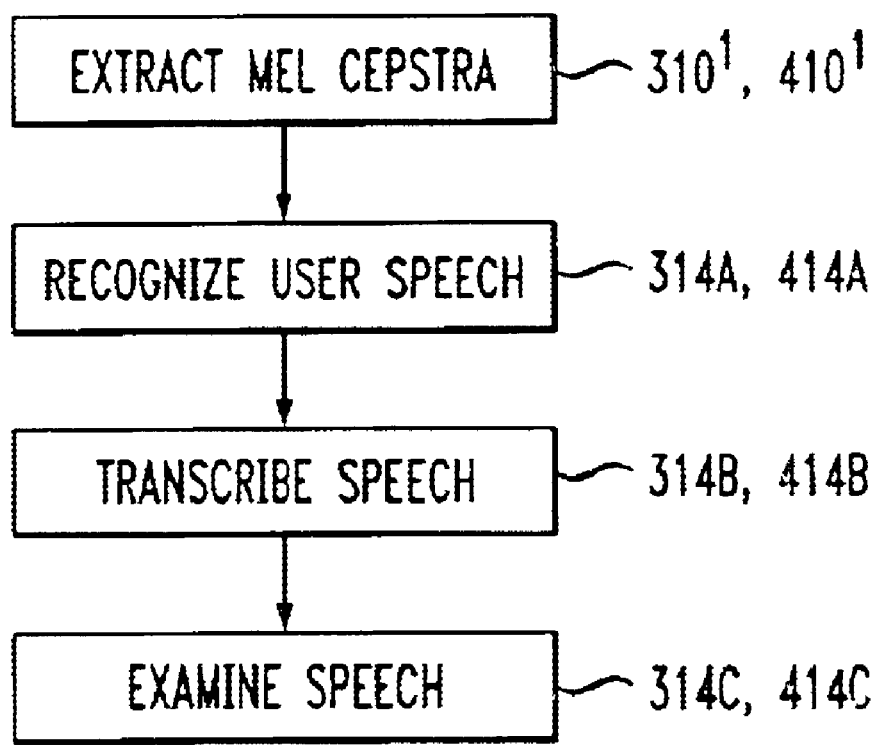
FIG. 4 depicts certain details of the method shown in FIG. 3, which are also applicable to FIG. 5.

Reference should now be had to FIG. 4 which depicts certain optional sub-steps which it is highly preferable to perform in connection with the method illustrated in FIG. 3. In particular, block 310 of FIG. 3 can, if desired, include extracting at least MEL cepstra, as shown in block 310' in FIG. 4. In this case, the method can further comprise the additional steps of recognizing speech of the user based on the MEL cepstra, per block 314A, transcribing the speech, per block 314B, and examining the speech per block 314C. The speech can be examined for at least one of word choice and vocabulary to determine at least one of educational level of the user, socioeconomic classification of the user, and dialect of the user. Other user attributes related to word choice and vocabulary can also be determined as desired. The steps 314A, 314B, and 314C can, in another sense, be thought of as sub-steps of the processing block 314 in FIG. 3.

Referring back to FIG. 3, the end of the process can be represented per block 324.

Figure 5:
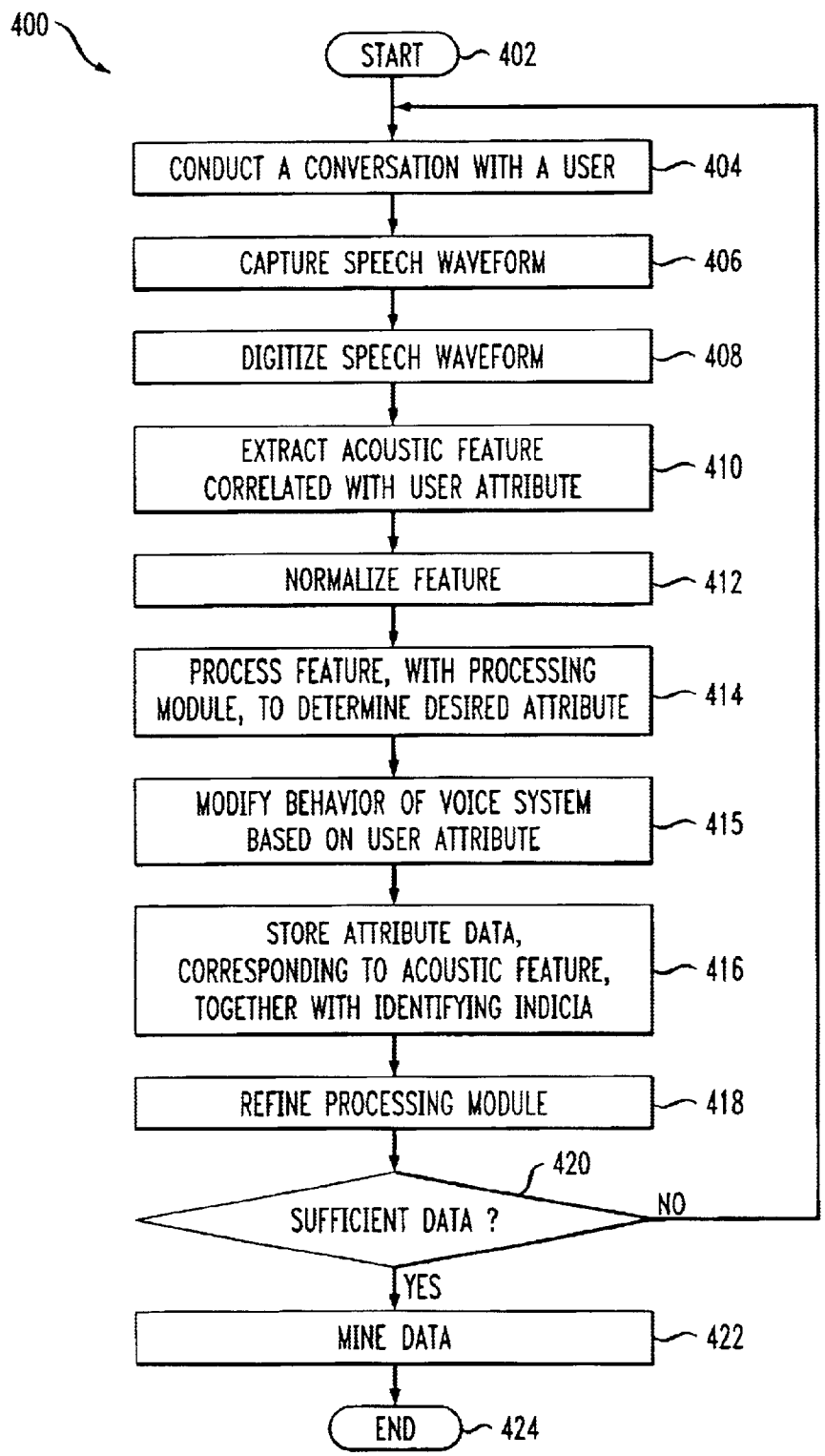
FIG. 5 is a flowchart of a method, in accordance with the present invention, for tailoring a voice system response to an acoustically-determined state of a voice system user.

Reference should now be had to FIG. 5, which depicts a flowchart 400 representative of a method, in accordance with the present invention, of tailoring a voice system response to an acoustically determined state of a voice system user. After starting at block 402, the method includes the step of conducting a conversation with the voice system user, via the voice system, per block 404. The method further includes the step of capturing a speech waveform associated with utterances spoken by the voice system user during the conversation, per block 406. Still further, the method includes the step of digitizing the speech waveform, per block 408, to provide a digitized speech waveform. Yet further, per block 410, the method includes the step of extracting, from the digitized speech waveform, at least one acoustic feature which is correlated with at least one user attribute. The at least one user attribute can include any of the user attributes discussed above. It will be appreciated that blocks 402–410 are similar to blocks 302–310 in FIG. 3.

Finally, the method can include, per block 415, modifying behavior of the voice system based on the at least one user attribute. The modification of the behavior of the voice system can include at least one of real-time changing of the business logic of the voice system, and real-time modifying of the voice system response, as compared to an expected response of the voice system without the modification. Reference should be had to the discussion of the apparatus above. For example, a real-time modification of the voice system response could be transferring a perturbed user to a human operator.

The extracting step per block 410 can include extracting of any of the aforementioned emotional state features, or of any of the other features previously discussed. Per block 412, the method can optionally include the additional step of normalizing the acoustic feature, particularly in the case when the acoustic feature is an emotional state feature. The method can further optionally include the additional step of storing attribute data corresponding to the acoustic feature which is correlated with the at least one user attribute, together with at least one identifying indicia, in a data warehouse, in accordance with block 416. The storage can be in a form to facilitate subsequent data mining thereon, and can include one of a raw and a processed condition. This step can be essentially similar to those discussed above in the method represented by flowchart 300. It will be appreciated that, per block 414, the feature could be processed with a processing module to determine the desired attribute. In this case, the attribute data could be the attribute itself; when no processing takes place, the attribute data could be the raw acoustic feature. Although the method depicted in FIG. 5 can be confined to modification of behavior of the voice system, the refining step per block 418, repetition controlled by decision block 420, and data mining step 422 can all be carried out if desired (e.g., just as for the method depicted in FIG. 3). Block 424 signifies the end of the method steps.

Just as in the method represented by flowchart 300, the method represented by flowchart 400 can determine certain user attributes based on transcription of the user's speech. Accordingly, in the extracting step, block 400, the extraction can include at least MEL cepstra. With reference now again to FIG. 4, this is accomplished in block 410'. Further steps can include recognizing speech of the user based on the MEL cepstra, per block 414A; transcribing the speech, per block 414B; and examining the speech, per block 414C, for at least one of word choice and vocabulary so as to determine at least one of educational level of the user, socioeconomic classification of the user, and dialect of the user. As before, other user attributes related to word choice and vocabulary can be determined.

Figure 6:
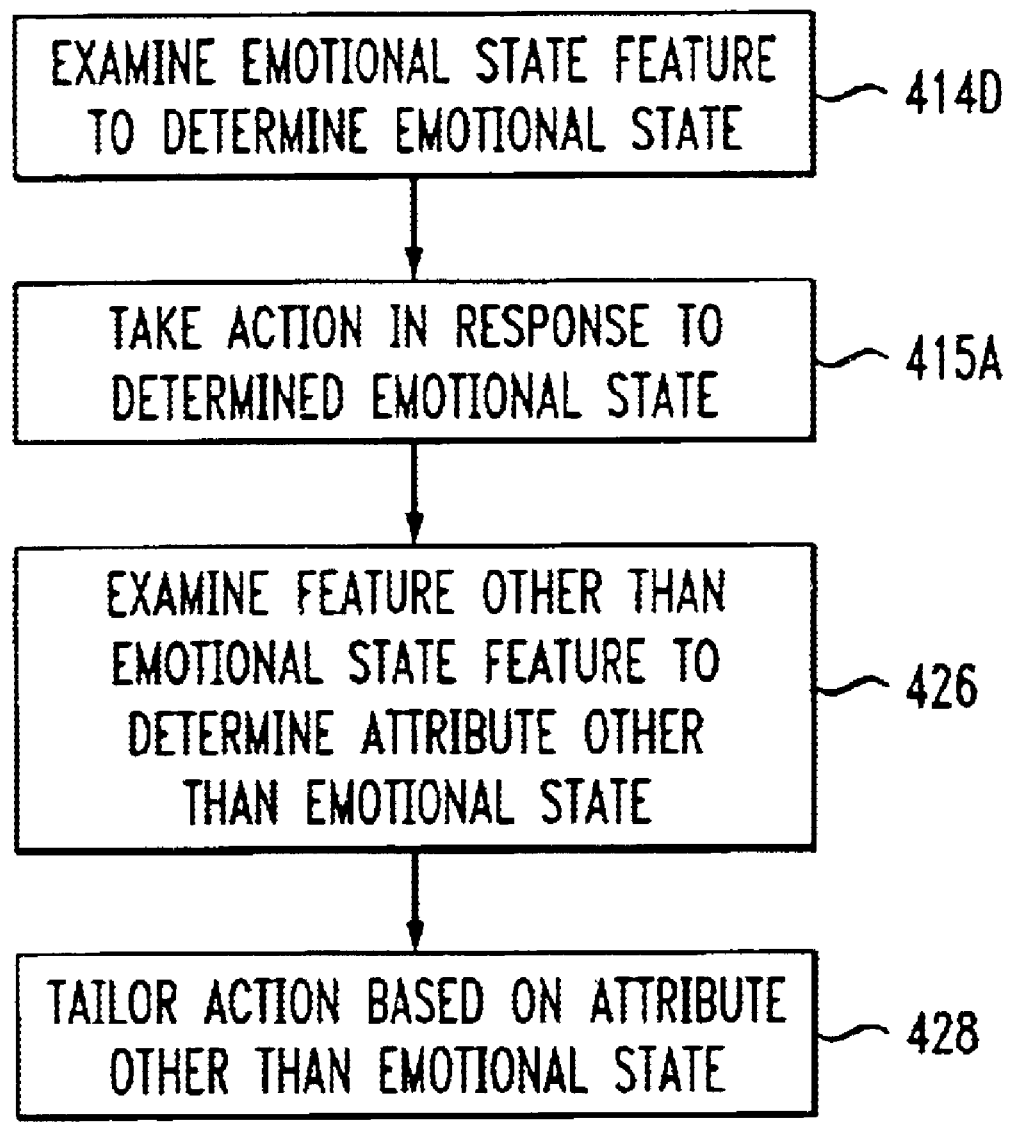
FIG. 6 depicts certain details of the method of FIG. 5.

Reference should now be had to FIG. 6 which depicts certain details associated with certain aspects of the method of flowchart 400. In particular, in some embodiments of the method according to flowchart 400, the processing step 414 can include examining an emotional state feature to determine an emotional state of the user, per block 414D in FIG. 6. Further, the modification of behavior block 415 can include taking action in response to the emotional state previously determined, per block 415A in FIG. 6. Thus, the emotional state feature can be examined to determine whether the user is in a jovial (i.e., happy) emotional state or if he or she is in, for example, at least one of a disgusted, contemptuous, fearful and angry emotional state. When the user is found to be in jovial emotional state, he or she can be offered at least one of a product and a service, as the action taken in block 415A. Alternatively, when the user is found to be in jovial emotional state, a marketing study can be performed on the user as the action taken in block 415A.

Still with reference to FIG. 6, in cases where the emotional state feature is used to determine emotional state, a feature other than an emotional state feature can be examined to determine an attribute other than emotional state, per block 426, and then the action taken in block 415A can be tailored in response to the attribute other than emotional state, per block 428. For example, when the jovial user is offered one of a product and a service, the product or service which is offered can be tailored based on the at least one user attribute other than emotional state. Alternatively, when the jovial user is made the subject of a marketing study, the marketing study can be tailored in response to the at least one user attribute other than emotional state. For example, suppose a jovial user is to be offered one of a product and a service. Their language pattern could be examined to determine that they were from a rural area in the southern United States where bass fishing was popular and, if desired, pitch could additionally be examined to determine that they were of the male gender. Products such as bass fishing equipment and videos could then be offered to the subject. Or, suppose, that the jovial subject on which a marketing study is to be done is determined to be a middle aged woman from a wealthy urban area who is highly educated. The marketing study could be tailored to quiz her about her buying habits for expensive cosmetics, stylish clothing, or trendy vacation resorts.

As noted, the emotional state feature could be examined to determine if the user is in one of a disgusted, contemptuous, fearful and angry emotional state. If the method were being conducted using an IVR system, and such an emotional state were detected, then block 415A could constitute switching the user from the IVR to a human operator in response to the user's detected emotional state. Alternatively, if a similar emotional state were detected, in a case where a hybrid interactive voice response system were employed, the action taken in block 415A could be switching the user from a low-level human operator to a higher-level human supervisor in response to the user's emotional state.

Yet further, the emotional state feature could be examined to determine whether the user was in a confused emotional state. This can be done using techniques known in the art, as set forth, for example, in the ICSLP'98 papers discussed above. Confusion may be evidenced, e.g., by delays in answering a question, stuttering, repetitions, false starts and the like. Thus, speech recognition and transcription are valuable. When a confused emotional state is detected, the action taken in block 415A could then be the switching of the user from a substantially automatic IVR system to a human operator in response to the confused emotional state.

The present invention can also include a program storage device readable by machine, tangibly embodying a program of instructions executable by the machine to perform the method steps of any of the methods disclosed herein, or any subset of the steps of those methods. For example, where certain subsets of the method steps were conveniently performed by a general purpose computer, or a processor portion of an IVR system, suitable program instructions could be written on a diskette, CD-ROM or the like. In the method shown in flowchart 300, such method steps could include reading digital data corresponding to a speech waveform associated with utterances spoken by the voice system user during a conversation between the voice system user and at least one of a human operator and a voice-enabled machine system. Program instructions for additional steps could include instructions to accomplish the tasks depicted in blocks 310 and 316, or any of the other blocks, as desired.

Similarly, with reference to the method depicted in flowchart 400, a first step to be performed via program instructions could include reading digital data corresponding to a speech waveform associated with utterances spoken by the voice system user during a conversation between the voice system user and at least one of a human operator and a voice-enabled machine system. Additional method steps to be incorporated in the program instructions could be, for example, those in block 410 and block 415, as discussed above, or indeed, any of the other method steps discussed herein.

It should be understood that features can be extracted and decisions dynamically returned by the models in the present invention. In addition to those examples already set forth, when a user, such as customer, sounds fearful, a human operator can intercept the call for a variety of reasons, for example, to make sure that the transaction is not coerced. Furthermore, anger can be detected in a user (or, for that matter, an operator) and in addition to modifying responses of a automatic or hybrid IVR system, could be used for quality control, e.g., as a means to evaluate and train customer service agents.

The present invention can be extended to other than acoustic information. For example, video information can be included, whether alone or accompanying audio data. Accordingly, method steps calling for conducting a conversation could instead involve conducting a visual transaction. Video information can help to identify or classify user attributes. Such data can be collected naturally through video-telephones, cameras at kiosks, cameras on computers, and the like. Such attributes and emotional states as smiling, laughing, crying and the like can be identified. Further, voice segments corresponding to certain user attributes or emotional states, which could be visually determined, can be labeled. This would permit creation of a training data base which would be useful for creating automatic techniques for identification of user attributes via acoustic data only. Accordingly, data mining could be performed on visually-determined user attributes only, on acoustically determined user attributes only, or on both.

Determination of user attributes from appearance can be done based on common human experience, i.e., red face means angry or embarrassed, smile means happiness or jovial mood, tears mean sadness. Furthermore, any appropriate biometric data can be taken in conjunction with the video and acoustic data. Yet further, data can be taken on more than one individual at one time. For example, parents and children could be simultaneously monitored or a married couple searching for a house or car could also be simultaneously monitored. One might detect children who were happy with a junk food menu item, while their parents were simultaneously unhappy with that choice. A husband might be angry, and his wife happy, at her choice of an expensive jewelry purchase. Alternatively, a husband might be happy and his wife unhappy at his choice of purchasing an expensive set of golf clubs.

As noted, time stamping can be employed as an indicia to be stored together with user attribute data. This can permit studies of how people respond at different times during the day, or can watch them evolve at different times during their life, for example, as children grow into teenagers and then adults, or as the tastes of adults change as they grow older. Similarities in relatives can also be tracked and plotted. Yet further, one of the user attributes which can be tracked is fatigue. Such a system could be installed, for example, in an automobile, train, aircraft, or long distance truck to monitor operator fatigue and to prompt the operator to pull over and rest, or, for example, to play loud music to keep the operator awake. Co-assigned U.S. patent application Ser. No. 09/078,807 of Zadrozny and Kanevsky, entitled "Sleep Prevention Dialog Based Car System," filed May 14, 1998, is expressly incorporated herein by reference.

It should be noted that the voice systems discussed herein can include telephone systems, kiosks, speaking to a computer and the like. The term "acoustic feature" is to be broadly understood and, as discussed, can include either raw or processed features, or both. For example, when the acoustic feature is MEL cepstra certain processed features could include key words, sentence parts, or the like. Some key words could be, for example, unacceptable profane words, which could be eliminated, result in summoning a manager, or result in disciplinary action against an employee. It should also be emphasized that in the apparatus and method for performing real time modification of a voice system, storage of an attribute, with an indicia, in the warehouse is optional and need not be performed.

When training the models, human operators can annotate data when making educated guesses about various user attributes. Alternatively, annotation can be done automatically using an existing set of classifiers which are already trained. A combination of the two techniques can also be employed. The indicia which are stored can include, in addition to a time stamp and the other items discussed herein, a transaction event or results, or any other useful information. The method depicted in flowchart 400 could also be used in a live conversation with a human operator with manual prompts to change the business logic used by the operator, or to summon a supervisor automatically when anger or other undesirable occurrences are noted.

While there have been described what are presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. A method for collecting, in a data warehouse, data associated with a voice of a voice system user, said method comprising the steps of:

(a) conducting a conversation with the voice system user via at least one of a human operator and a voice-enabled machine system;

(b) capturing a speech waveform associated with utterances spoken by the voice system user during said conversation;

(c) digitizing said speech waveform to provide a digitized speech waveform;

(d) extracting, from said digitized speech waveform, at least one acoustic feature which is correlated with at least one user attribute, said at least one user attribute including at least one of:

(d-1) gender of the user;

(d-2) age of the user;

(d-3) accent of the user;

(d-4) native language of the user;

(d-5) dialect of the user;

(d-6) socioeconomic classification of the user;

(d-7) educational level of the user; and (d-8) emotional state of the user;

(e) storing attribute data corresponding to said acoustic feature which is correlated with said at least one user attribute, together with at least one identifying indicia, in the data warehouse in a form to facilitate subsequent data mining thereon;

(f) repeating steps (a)–(e) for a plurality of additional conversations, with additional users, to provide a collection of stored data including the attribute data and identifying indicia; and (g) mining the collection of stored data to provide information for modifying underlying business logic of the voice system.

2. The method of claim 1, wherein step (e) comprises storing with at least one identifying indicia which comprises a time stamp.

3. The method of claim 1, wherein step (d) includes extracting at least one of fundamental frequency, variation in fundamental frequency, running average pitch, running pitch variance, pitch jitter, running energy variance, speech rate and shimmer as at least one emotional state feature which is correlated with the emotional state of the user.

4. The method of claim 3, further comprising the additional step of normalizing said at least one emotional state feature.

5. The method of claim 1, further comprising the additional step of processing said at least one acoustic feature to determine said at least one user attribute, wherein said attribute data in step (e) comprises at least a value of said user attribute.

6. The method of claim 5, further comprising the additional step of automatically refining said processing step in response to storage of additional attribute data in the data warehouse.

7. The method of claim 1, wherein step (e) comprises storing said attribute data as at least one substantially raw acoustic feature.

8. The method of claim 1, wherein step (d) includes extracting at least MEL cepstra, further comprising the additional steps of recognizing speech of the user based on said MEL cepstra; transcribing said speech; and examining said speech for at least one of word choice and vocabulary to determine at least one of educational level of the user, socioeconomic classification of the user, and dialect of the user.

9. The method of claim 1, further comprising the additional step of:
(h) modifying, in real time, behavior of the voice system based on said at least one user attribute.

10. The method of claim 9, wherein said modifying in step (h) comprises at least one of:
real-time changing of business logic of the voice system; and
real-time modifying of the voice system response, as compared to an expected response of the voice system without said modifying.

11. The method of claim 3, further comprising the additional steps of:
examining said at least one emotional state feature to determine if the user is in a jovial emotional state; and
offering the user at least one of a product and a service in response to said jovial emotional state.

12. The method of claim 11, further comprising the additional steps of:
determining at least one user attribute other than emotional state; and
tailoring said at least one of a product and a service in response to said at least one user attribute other than emotional state.

13. The method of claim 3, further comprising the additional steps of:
examining said at least one emotional state feature to determine if the user is in a jovial emotional state; and
performing a marketing study on the user in response to said jovial emotional state.

14. The method of claim 13, further comprising the additional steps of:
determining at least one user attribute other than emotional state; and
tailoring said market study in response to said at least one user attribute other than emotional state.

15. The method of claim 3, wherein the voice system is a substantially automatic interactive voice response (IVR) system, further comprising the additional steps of:
examining said at least one emotional state feature to determine if the user is in at least one of a disgusted, contemptuous, fearful and angry emotional state; and
switching said user from said IVR to a human operator in response to said at least one of a disgusted, contemptuous, fearful and angry emotional state.

16. The method of claim 3, wherein the voice system is a hybrid interactive voice response (IVR) system, further comprising the additional steps of:
examining said at least one emotional state feature to determine if the user is in at least one of a disgusted, contemptuous, fearful and angry emotional state; and
switching said user from a low-level human operator to a higher-level human supervisor in response to said at least one of a disgusted, contemptuous, fearful and angry emotional state.

17. The method of claim 3, wherein the voice system is a substantially automatic interactive voice response (IVR) system, further comprising the additional steps of:
examining said at least one emotional state feature to determine if the user is in a confused emotional state; and
switching said user from said IVR to a human operator in response to said confused emotional state.

18. An apparatus for collecting data associated with a voice of a user, said apparatus comprising:
(a) a dialog management unit which conducts a conversation with the user;
(b) an audio capture module which is coupled to said dialog management unit and which captures a speech waveform associated with utterances spoken by the user during the conversation;
(c) an acoustic front end which is coupled to said audio capture module and which is configured to:
receive and digitize the speech waveform to provide a digitized speech waveform; and
extract, from the digitized speech waveform, at least one acoustic feature which is correlated with at least one user attribute, said at least one user attribute including at least one of:
(c-1) gender of the user;
(c-2) age of the user;
(c-3) accent of the user;
(c-4) native language of the user;
(c-5) dialect of the user;
(c-6) socioeconomic classification of the user;
(c-7) educational level of the user; and
(c-8) emotional state of the user;
(d) a processing module which is coupled to said acoustic front end and which analyzes said at least one acoustic feature to determine said at least one user attribute; and
(e) a data warehouse which is coupled to said processing module and which stores said at least one user attribute, together with at least one identifying indicia, in a form for subsequent data mining thereon;
wherein:
said dialog management unit is configured to conduct a plurality of additional conversations with additional users;
said audio capture module is configured to capture a plurality of additional speech waveforms associated with utterances spoken by said additional users during said plurality of additional conversations;

said acoustic front end is configured to receive and digitize said plurality of additional speech waveforms to provide a plurality of additional digitized speech waveforms, and is further configured to extract, from said plurality of additional digitized speech waveforms, a plurality of additional acoustic features, each correlated with at least one attribute of one of said additional users;

said processing module is configured to analyze said additional acoustic features to determine a plurality of additional user attributes;

said data warehouse is configured to store said plurality of additional user attributes, each together with at least one additional identifying indicia, in said form for said subsequent data mining; and said processing module and said data warehouse are configured to mine the stored user attributes and identifying indicia to provide information for modifying underlying business logic of the apparatus.

19. The apparatus of claim 18, wherein said audio capture module comprises one of an analog to digital converter board, an interactive voice response (IVR) system and a microphone.

20. The apparatus of claim 18, wherein said dialog management unit comprises a telephone interactive voice response (IVR) system.

21. The apparatus of claim 20, wherein said processing module comprises a processor portion of said IVR.

22. The apparatus of claim 18, wherein said processing module comprises a separate general purpose computer with appropriate software.

23. The apparatus of claim 18, wherein said processing module comprises an application specific circuit.

24. The apparatus of claim 18, wherein said processing module comprises at least an emotional state classifier.

25. The apparatus of claim 24, wherein said processing module further comprises at least:

a speaker clusterer and classifier;

a speech recognizer; and an accent identifier.

26. The apparatus of claim 25, further comprising a post processor which is coupled to said data warehouse and which is configured to transcribe user utterances and to perform keyword spotting thereon.

27. The apparatus of claim 18, wherein said processing module is configured to modify behavior of the apparatus, in real time, based on said at least one user attribute.

28. The apparatus of claim 27, wherein said processing module modifies behavior of the apparatus, at least in part, by prompting a human operator thereof.

29. The apparatus of claim 27, wherein said processing module comprises a processor portion of an interactive voice response (IVR) system and wherein said processor module modifies behavior of the apparatus, at least in part, by modifying business logic of the IVR.

30. A program storage device readable by machine, tangibly embodying a program of instructions executable by the machine to perform method steps for collecting, in a data warehouse, data associated with a voice of a voice system user, said method steps comprising:

(a) reading digital data corresponding to a speech waveform associated with utterances spoken by the voice system user during a conversation between the voice system user and at least one of a human operator and a voice-enabled machine system;

(b) extracting, from said digital data, at least one acoustic feature which is correlated with at least one user attribute, said at least one user attribute including at least one of:

(b-1) gender of the user;

(b-2) age of the user;

(b-3) accent of the user;

(b-4) native language of the user;

(b-5) dialect of the user;

(b-6) socioeconomic classification of the user;

(b-7) educational level of the user; and (b-8) emotional state of the user; and (c) storing attribute data corresponding to said acoustic feature which is correlated with said at least one user attribute, together with at least one identifying indicia, in the data warehouse in a form to facilitate subsequent data mining thereon;

(d) repeating steps (a)–(c) for a plurality of additional conversations, with additional users, to provide a collection of stored data including suitable attribute data and identifying indicia for each conversation; and (e) mining the collection of stored data to provide information for modifying underlying business logic of the voice system.

31. The program storage device of claim 30, wherein said method steps further comprise:

(f) modifying behavior of the voice system, in real time, based on said at least one user attribute.

* * * * *